E. L. DOZIER.
Thrashing Machine.
No. 5,050.
Patented April 3, 1847.
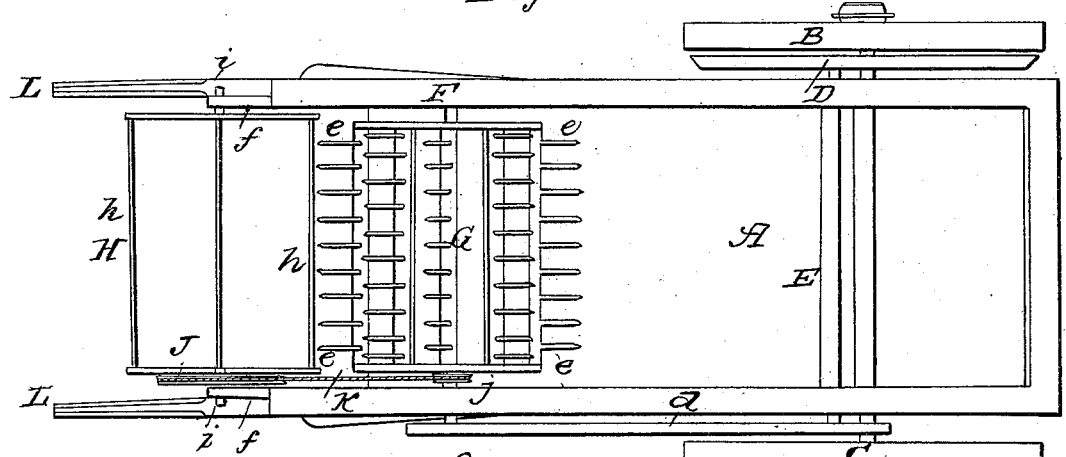
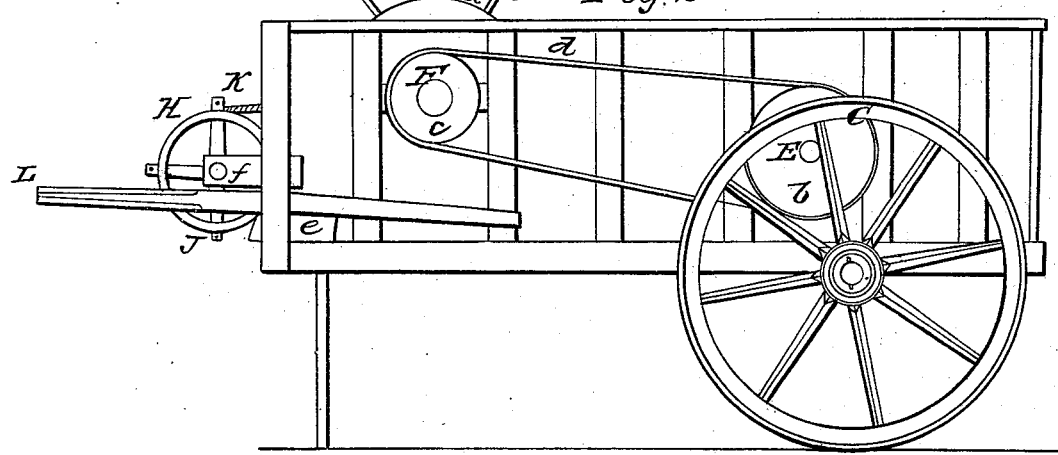
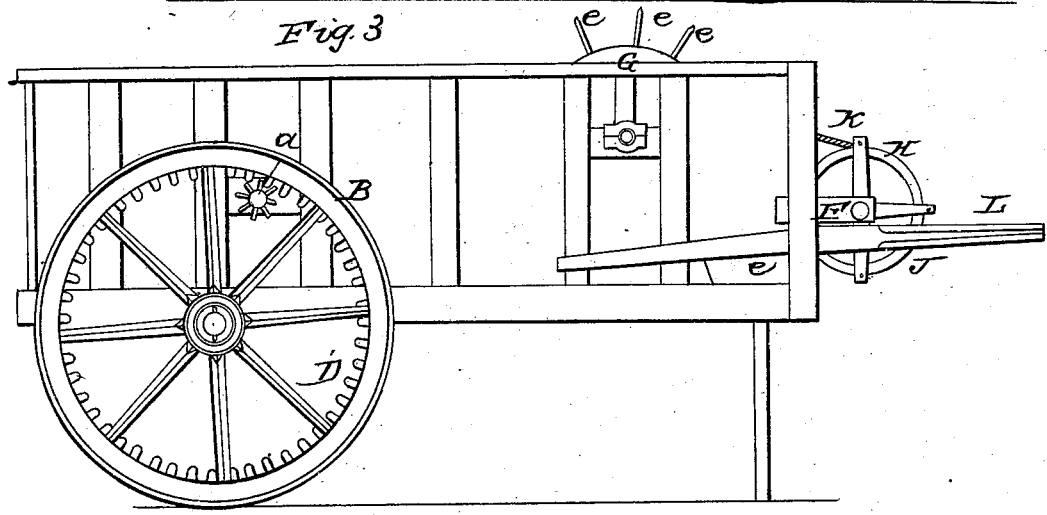

UNITED STATES PATENT OFFICE.

E. L. DOZIER, OF CAMDEN COUNTY, NORTH CAROLINA.

THRESHING-MACHINE.

Specification of Letters Patent No. 5,050, dated April 3, 1847.

*To all whom it may concern:*

Be it known that I, EDMUND L. DOZIER, of the county of Camden and State of North Carolina, have invented a new and useful Machine for Threshing While Standing Wheat, Rye, Oats, and other Small Grain, which I designate "Dozier's Threshing-Machine"; and I do hereby declare that the following is a full, clear, and exact description of the construction and operation of the same, reference being had to the accompanying drawings, making a part of this specification, of which—

Figure 1 is a plan. Fig. 2 is a left side elevation. Fig. 3 is a right side elevation.

To enable others skilled in the art to make and use my invention, I will proceed to describe the construction and operation.

I construct a cart A of the materials usually employed for such purposes, of an oblong, or any other suitable shape and dimensions, having the sides somewhat longer than the bottom, at the front. To the cart I attach two wheels B and C, by means of an axle placed under it at any suitable point. On the front ends at the bottom of the cart, are legs or props, to rest the horses when the grain is being shoveled out through a door or gate made for that purpose at the back of the cart. On the inside of the wheel B, I affix an annular wheel D, to be made of metal or any other suitable material, equal in circumference to the wheel to which it is to be attached, and of a proper thickness. Above the axle at any required height, I place a shaft E made of iron or other material, of sufficient strength parallel to the axle-tree, working in proper bearings in the cart. On one end of this shaft, is fixed a pinion (*a*, Fig. 3) to be acted upon by the wheel D. On the other end is to be placed a band wheel (*b*). The pinion (*a*) and band wheel (*b*,) to be fixed so as to revolve with it. Near the front of the cart, and at any proper distance from the bottom, is another shaft (F,) parallel to the axle-tree, working in proper bearings in the sides of the cart. On the end of this shaft and on the same side with the band wheel (*b*), is a whirl (*c*) connected with the wheel (*b*) by a strap or band (*d*).

On the inside of the cart, on the shaft (F) is fixed a cylinder or drum G revolving with it. Around this cylinder or drum (G) and lengthwise of it, in equidistant rows, are arranged pins or teeth (*e, e, e*) of a length nearly sufficient to touch the bottom of the cart. To the sides of the cart in front, are placed beams (*f f*) projecting a short distance from the cart in a horizontal direction, to support a reel (H,) of a size sufficiently large to come nearly in contact with the pins arranged in the drum (G).

The use and operation of the reel (H) will be hereinafter mentioned. Attached to one end of the reel is a grooved wheel (J) connected with a pulley (*j*,) on the shaft (F,) between the inside of the cart and the head of the drum or cylinder (G) by a cord (K). The shafts (L) to which the horses are attached, are secured to the sides of the cart in such a manner as to allow them to be raised or lowered at pleasure, and are to be kept in their places when raised by blocks (*l*) resting on the outside edge of the cart, which project sufficient for that purpose. The horses being started, the revolution of the wheel (B) communicates motion to the cylinder (G) and reel (H) and causes them to revolve by means of the pinion (*a*) band wheel (*b*) whirl (*c*) groove wheel (J) and pulley (*j*). The reel in its revolutions bends or presses down the stalks of the grain and brings the heads of the grain in contact with the pins (*e e*) arranged in the revolving cylinder or drum (G) which combs it out by means of the pins (*e e*) passing through it, as the cylinder (G) revolves and throws it in the back of the cart which is shoveled out when required through the door.

What I claim as new and desire to secure by Letters Patent, is—

The revolving drum or cylinder (G) in combination with the reel (H), arranged and operated in the manner and for the purpose herein described and set forth.

E. L. DOZIER.

Witnesses:
M. S. BOUSHALL,
EDWIN FERIBEE.